United States Patent
Koike et al.

(10) Patent No.: US 8,885,287 B1
(45) Date of Patent: Nov. 11, 2014

(54) METHOD AND APPARATUS FOR PREVENTION OF FE CONTAMINATION WITH OXYGEN MIXTURE IN A HARD DISK DRIVE

(71) Applicant: HGST Netherlands B.V., Amsterdam (NL)

(72) Inventors: Minoru Koike, Odawara (JP); Masamichi Sakauchi, Yamato (JP); Koichi Suzuki, Fujisawa (JP); Kazushi Tsuwako, Tokyo (JP)

(73) Assignee: HGST Netherlands B.V., Amsterdam (NL)

( * ) Notice: Subject to any disclaimer, the term of this patent is extended or adjusted under 35 U.S.C. 154(b) by 0 days.

(21) Appl. No.: 14/148,226

(22) Filed: Jan. 6, 2014

(51) Int. Cl.
G11B 5/39 (2006.01)

(52) U.S. Cl.
USPC .................................................. 360/97.12

(58) Field of Classification Search
USPC .................................................. 360/97.12
See application file for complete search history.

(56) References Cited

U.S. PATENT DOCUMENTS

| | | | |
|---|---|---|---|
| 5,454,157 A | 10/1995 | Ananth et al. | |
| 6,433,957 B1 | 8/2002 | Rudd et al. | |
| 7,062,387 B1 | 6/2006 | Burns et al. | |
| 7,123,440 B2 * | 10/2006 | Albrecht et al. | 360/99.18 |
| 7,961,427 B2 * | 6/2011 | Dorbeck et al. | 360/97.11 |
| 7,986,490 B2 * | 7/2011 | Hirono et al. | 360/97.22 |
| 8,014,167 B2 * | 9/2011 | Gunderson et al. | 361/800 |
| 8,094,409 B2 | 1/2012 | Feliss et al. | |
| 8,199,425 B1 * | 6/2012 | Gustafson et al. | 360/97.12 |
| 8,279,552 B2 | 10/2012 | Stipe | |
| 8,451,559 B1 * | 5/2013 | Berding et al. | 360/99.21 |
| 8,514,514 B1 * | 8/2013 | Berding et al. | 360/97.11 |
| 8,533,934 B2 * | 9/2013 | McGuire et al. | 29/603.03 |
| 2004/0103523 A1 * | 6/2004 | Yamada | 29/603.01 |
| 2006/0050429 A1 | 3/2006 | Gunderson et al. | |
| 2011/0149435 A1 | 6/2011 | Brown | |
| 2013/0088795 A1 | 4/2013 | Brown | |

OTHER PUBLICATIONS

Nan Liu; Jinglin Zheng; Bogy, D.B., "Thermal flying-height control sliders in hard disk drives filled with air-helium gas mixtures," Applied Physics Letters, vol. 95, No. 21, pp. 213505,213505-3, Nov. 2009. http://ieeexplore.ieee.org/xpl/articleDetails.jsp?tp=&arnumber=5343544.

HGST, "HGST announces radically new, helium-filled hard disk drive platform," (Sep. 13, 2012) http://www.hgst.com/press-room/press-releases/hgst-announces-radically-new-helium-filled-hard-disk-drive-platform.

* cited by examiner

*Primary Examiner* — Mark Blouin
(74) *Attorney, Agent, or Firm* — Billion & Armitage; Richard E. Billion (57) ABSTRACT

A disk drive for storing information representing data includes a base, a spindle rotatably attached to the base, and a plurality of disks having magnetizable disk surfaces attached to the spindle. The disk drive also includes a plurality of read/write transducers for writing to and reading from the plurality of magnetizable disk surfaces, and a cover attached to the base. The cover and base form a substantially sealed disk enclosure. The disk enclosure is substantially filled with a mixture of gases including an oxygen portion in the range of 0.1-3% of the mixture, and a low-density gas portion.

21 Claims, 11 Drawing Sheets

METHOD AND APPARATUS FOR PREVENTION OF FE CONTAMINATION WITH OXYGEN MIXTURE IN A HARD DISK DRIVE

TECHNICAL FIELD

Various embodiments described herein relate to a method and apparatus for prevention of Fe contamination with oxygen mixture in hard disk drive. More particularly, the method and apparatus is for a hard disk drive that includes helium gas in the disk enclosure.

BACKGROUND

A disk drive is an information storage device. The most basic parts of a disk drive are an information storage disk that is rotated, an actuator that moves a slider carrying one or more transducers to various locations over the disk, and electrical circuitry that is used to write and read data to and from the disk. The one or more information storage disks are clamped to a rotating spindle. More specifically, storing data includes writing information representing the data to portions of tracks on a disk. The transducer includes two separate devices—a write transducer that writes information representing data to the disk, and a read transducer or sensor that reads information from the disk.

Storing data includes writing information representing the data to the disk, Conventional disk drives with magnetic media organize data in concentric tracks. There are several constant goals related to these storage devices. One goal is to store increased amounts of data. Another goal is to save power or make a "greener", less wasteful hard disk drive. Still another goal is to make a reliable device that will operate for many hours. A common operating parameter is mean time between failures (MTBF). Currently, the MBTF for a hard disk drive is near 2M hours. It is contemplated that this number will continue to rise as disk drives become even more reliable.

Recently some disk drives are being filled with low-density gases other than air (i.e., helium) to enhance their performance. The lower density gas can reduce the aerodynamic drag between the disks and their read/write heads. This reduced drag can, in turn, reduce arm and suspension flutter and actuator buffeting. This reduced drag can also result in a reduction in power requirements for the spindle motor. The lower density gas also is more effective than air for conducting away heat generated during operation of the disk drive. The use of low-density gases can present other problems.

SUMMARY OF THE INVENTION

A disk drive for storing information representing data includes a base, a spindle rotatably attached to the base, and a plurality of disks having magnetizable disk surfaces attached to the spindle. The disk drive also includes a plurality of read/write transducers for writing to and reading from the plurality of magnetizable disk surfaces, and a cover attached to the base. The cover and base form a substantially sealed disk enclosure. The spindle, the plurality of disks, and the read/write transducers are within the disk enclosure. The disk enclosure is substantially filled with a mixture of gases including an oxygen portion in the range of 1-3% of the mixture, and a low-density gas portion. In some embodiments the oxygen portion is 1.5-2.5% of the gas filling the disk enclosure. In other embodiments, the oxygen portion is 1.8-2.2% of the gas filling the disk enclosure. In still another embodiment, oxygen portion is 1.9-2.1% of the gas filling the disk enclosure.

A method for preventing a premature failure within a disk drive includes forming a substantially sealed disk enclosure from a base and a cover, and adding a mixture of gas to the disk enclosure. The mixture includes a low-density gas portion and an oxygen portion. The oxygen portion is in the range of 1-3% of the gas mixture, in one embodiment, or is in the range of 1.8-2.3% of the gas mixture in another embodiment. In still another embodiment, the method includes plating an interior portion of the cover with a substantially non-oxidizing material.

A storage system for storing information representing data includes a plurality of disk drives. At least some of the plurality of disk drives further include a base, a spindle rotatably attached to the base, and a plurality of disks having magnetizable disk surfaces attached to the spindle. At least some of the plurality of disk drives also include a plurality of read/write transducers for writing to and reading from the plurality of magnetizable disk surfaces, a cover attached to the base, and a gas substantially filling a disk enclosure. The cover and the base form a substantially sealed disk enclosure. The spindle, and the plurality of disk and the read/write transducers are within the disk enclosure. The gas further includes an oxygen portion in the range of 1.6-2.3%; and a low-density gas portion.

BRIEF DESCRIPTION OF THE DRAWINGS

The embodiments will be readily understood by the following detailed description in conjunction with the accompanying drawings, wherein like reference numerals designate like structural elements, and in which.

DETAILED DESCRIPTION

In the following paper, numerous specific details are set forth to provide a thorough understanding of the concepts underlying the described embodiments. It will be apparent, however, to one skilled in the art that the described embodiments may be practiced without some or all of these specific details. In other instances, well known process steps have not been described in detail in order to avoid unnecessarily obscuring the underlying concepts.

In general, a hard disk drive with substantially pure He in the disk drive enclosure was found develop contaminants within the disk enclosure after about 1500 hours of testing when the environment was maintained at substantially 60 degrees Centigrade over that time. The Fe contaminants were deposited on one of the disk surfaces. The result was a degrade in the performance of the drive. The cause of Fe contamination was the absence of oxygen, not the existence of inert gas like He. In order to prevent Fe contamination, a mixture of He and oxygen was used in the disk enclosure of the disk drive. A mixture of 2% oxygen added to He was used to maintain low power consumption and low NRRO. The contaminants formed when there is a 2% oxygen mixture form volatile gases which are much less likely to deposit on a disk surface and cause performance problems.

Figure 1:
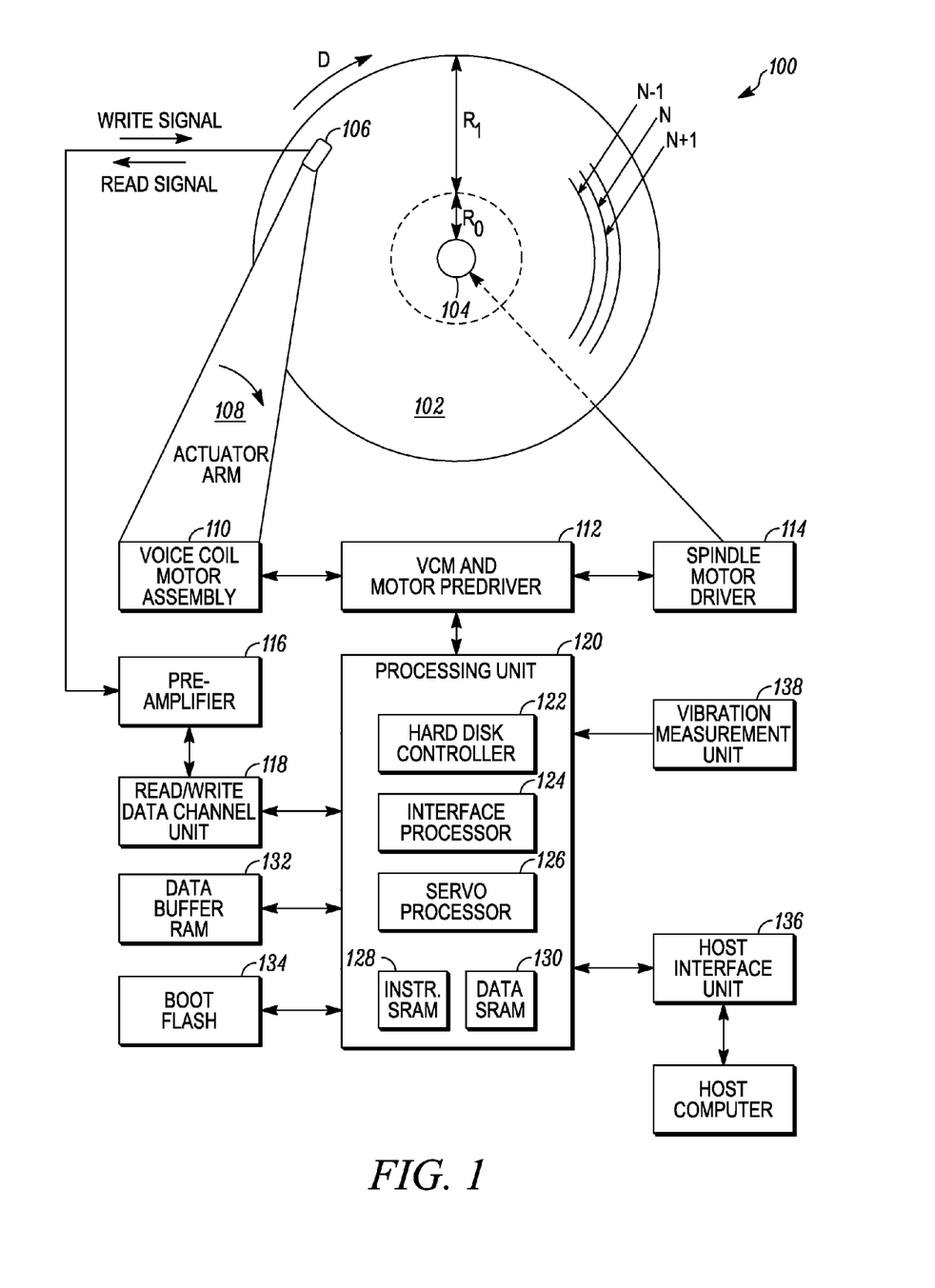
FIG. 1 is a schematic top view of a disk drive, according to an embodiment of the invention.

FIG. 1 is a schematic diagram illustrating an example hard disk drive that utilizes the techniques described in this disclosure. Hard disk drive 100, in this example, is operably coupled to a host device as an internal or an external data storage device. The disk drive 100 can be in a stand alone PC or can be part of a bank of disk drives used to store data, such as in a data warehouse. A host device may include, for example, a laptop or desktop computer or a similar device. The host device can also be a server. Hard disk drive 100, includes data recording disk or medium 102, spindle assembly 104, slider 106, actuator arm 108, voice coil motor assembly 110, a voice coil motor ("VCM") and motor predriver 112, spindle motor driver 114, preamplifier 116, read/write data channel 118, processing unit 120, data buffer RAM 132, boot flash 134, host interface unit 136, and vibration measurement unit 138. Further, processing unit 120 includes hard disk controller 122, interface processor 124, servo processor 126, instruction SRAM 128, and data SRAM 130. It should be noted that although example hard disk drive 100 is illustrated as having distinct functional blocks, such an illustration is for descriptive purposes and does not limit hard disk drive 100 to a particular hardware architecture. In a similar manner, processing unit 120 should not be limited to a particular hardware architecture based on the example illustrated in FIG. 1. Functions of hard disk drive 100 may be realized using any combination of hardware, firmware and/or software implementations.

Disk 102 is coupled to spindle assembly 104 and rotates in direction D about a fixed axis of rotation. Disk 102 may be rotated at a constant or varying rate. Typical rates of rotation range from less than 3,600 to more than 15,000 revolutions per minute. However, disk 102 may be rotated at higher or lower rates and the rate of rotation may be determined based on a magnetic recording technique. Spindle assembly 104 includes a spindle and a motor and is coupled to spindle motor driver 114. Spindle motor driver 114 provides an electrical signal to spindle assembly 104 and the rate at which the spindle rotates, and thereby disk 102, may be proportional to the voltage or current of the electrical signal. Spindle motor driver 114 is coupled to a spindle motor and motor predriver 112. The spindle motor is typically housed within the spindle assembly 104. The spindle motor and motor predriver 112 are configured to use feedback techniques to insure disk 102 rotates as a desired rate. For example, spindle motor and motor predriver 112 may be configured to receive current and/or voltage signals from the motor for example and adjust the electrical signal provided to spindle motor driver 114 using feedback circuits. The feedback circuits compare a desired rotational position to the actual radial position. In some embodiments, servo wedges associated with embedded servo are used to provide radial position information.

As illustrated in FIG. 1, VCM and motor predriver 112 is also coupled to voice coil motor assembly 110. In addition to providing an electrical signal to spindle motor driver 114, VCM and motor predriver 112 is also configured to provide an electrical signal to voice coil motor assembly 110. Voice coil motor assembly 110 is operably coupled to actuator arm 108 such that actuator arm 108 pivots based on the current or voltage of the electrical received from signal VCM and motor predriver 112. As illustrated in FIG. 1, slider 106 is coupled to actuator arm 108. Thus, VCM and motor predriver 112 adjusts the position of slider 106 with respect to disk 102. VCM and motor predriver 112 may use feedback techniques to ensure slider 106 maintains a desired position with respect to disk 102. In one example, VCM and motor predriver 112 includes an analog-to-digital converter to monitor electromagnetic fields and current from voice coil motor assembly 110.

Slider 106 is configured to read and write data to disk 102 according to a magnetic recording technique, for example, any of the example magnetic recording techniques described herein. Slider 106 includes read head and write head corresponding to each of a plurality of disks included as part of disk 102. Further, slider 106 may include one or more read and write heads for each disk. For example, each disk in a stack of disks includes two major surfaces to which data can be stored. In one embodiment, there is a slider 106 positioned in transducing relationship with one major surface and another slider 106 positioned in transducing relationship with the other major surface of each disk in the disk stack. Slider 106 is coupled to preamplifier 116. Preamplifier 116 may also be referred to as arm electronics (AE). Preamplifier 116 is configured to select a correct head from a plurality of heads for a particular read or write operation. Preamplifier 116 is configured to drive head 106 with a write current, during a write operation. Further, preamplifier 116 is configured to amplify read signals from slider 106, during a read operation using a programmable head bias current. Preamplifier 116 may also be configured to detect errors during each of the read and write operations. Preamplifier 116 may include a signal adaptive filter (SAF) for thermal asperity (TA) recovery during a read operation.

Preamplifier 116 receives data to be written to disk 102 from read/write data channel unit 118. Further, preamplifier 116 provides data read from disk 102 to read/write data channel unit 118. Data may originate from a host device and may be communicated to read/write data channel unit 118 via host interface unit 136 and processing unit 120. Host interface unit 136 provides a connection between hard disk drive 100 and a host device. Host interface unit 136 may operate according to a physical and logical characteristics defined according to a computer bus interface. Example standardized interfaces include ATA (IDE, EIDE, ATAPI, UltraDMA, SATA), SCSI (Parallel SCSI, SAS), Fibre Channel, and PCIe (with SOP or NVMe).

As illustrated in FIG. 1, processing unit 120 includes hard disk controller 122, interface processor 124, servo processor 126, instruction SRAM 128, and data SRAM 130. Instruction SRAM 128 may store a set of operation instructions for processing unit 120. In one embodiment, instructions are loaded to instruction SRAM 128 from boot flash 134 when hard disk drive 100 is powered on. Data SRAM 130 and data buffer RAM 132, which is coupled to processing unit 120 are configured to buffer blocks of data during read and write operations. For example, blocks of data received from host interface unit 136 may be sequentially stored to data SRAM 130 and data buffer RAM 132 before the data blocks are written to disk 102. It should be noted that although instruction SRAM 128, data SRAM 130, data buffer RAM 132, and boot flash 134 are illustrated as distinct memory units, the functions of instruction SRAM 128, data SRAM 130, data buffer RAM 132, and boot flash 134 may be implemented according to other types of memory architectures.

Hard disk controller 122 generally represents the portion of processing unit 120 configured to manage the transfer of blocks of data to and from host interface unit 136 and read/write data channel unit 118. Hard disk controller 122 can be configured to perform operations to manage data buffering and to interface with host interface unit 136, according to a defined computer bus protocol, as described above. For example, hard disk controller 122 can receive and parse packets of data from host interface unit 136. Further, hard disk controller 122 is configured to communicate with a host, such as a host computer or the like. For example, hard disk controller 122 may be configured to report errors to host and format disk 102 based on commands received from host. In other embodiments, the host merely sends write commands and read commands to the disk drive via the host interface unit 136 and the hard disk controller 122 handles formatting the disk and completing the read and write commands. The host interface unit 136 can include a read and write channel for encoding and decoding information representing data, performing error corrections on the data, and the like.

Disk 102 includes a stack of one or more disks having magnetic material deposited on one or both sides thereof. Disk 102 may be composed of a light aluminum alloy, ceramic/glass, or other suitable substrate that magnetic material may be deposited thereon. Using electromagnetic techniques, data may be stored on disk 102 by orientating an area of the magnetic material. Data stored on disk 102 may be organized as data blocks. Data blocks are typically 512 bytes or 4 K bytes in size, but may be other sizes as well. The magnetic areas of disk 102 may be arranged into a set of radially-spaced concentric tracks, illustrated in FIG. 1 as N−1, N, and N+1. A particular data block may be located within a portion of a particular track.

Magnetic material of disk 102 is configured according to one of a plurality of magnetic recording techniques. Examples of magnetic recording techniques include longitudinal magnetic recording (LMR) and perpendicular magnetic recording (PMR). Additional magnetic recording techniques include shingled magnetic recording (SMR) and heat assisted magnetic recording (HAMR). SMR is a type of PMR that increases bit density compared to PMR by allowing previously written tracks to be partially overwritten. In other words, the write head overlaps a previously written track and erases a portion of the previously written track. The result is a thinner track and a disk drive having a higher track pitch or increased track density. The previous tracks are partially overlapped, similar to shingles on a roof and hence the name shingled magnetic recording. HAMR may be used in conjunction with LMR, PMR, or SMR techniques to achieve higher areal storage density.

The bit density, distance between tracks (referred to as track pitch), and track density of disk 102 may vary according to a magnetic recording technique. Track density may be defined according to the number of tracks per radial length (e.g., track per inch (TPI). In some hard disk drives, the disk enclosure is filled with low-density gases other than air (i.e., helium) to enhance their performance. The lower density gas can reduce the aerodynamic drag between the disks and their read/write heads. This reduced drag can, in turn, reduce arm and suspension flutter and actuator buffeting. This reduced drag can also result in a reduction in power requirements for the spindle motor. The lower density gas also is more effective than air for conducting away heat generated during operation of the disk drive. The use of low-density gases also reduces nonrepeatable run out (NRRO) errors. The result is that tracks can be more closely spaced or the track density can be increased.

Figure 2:
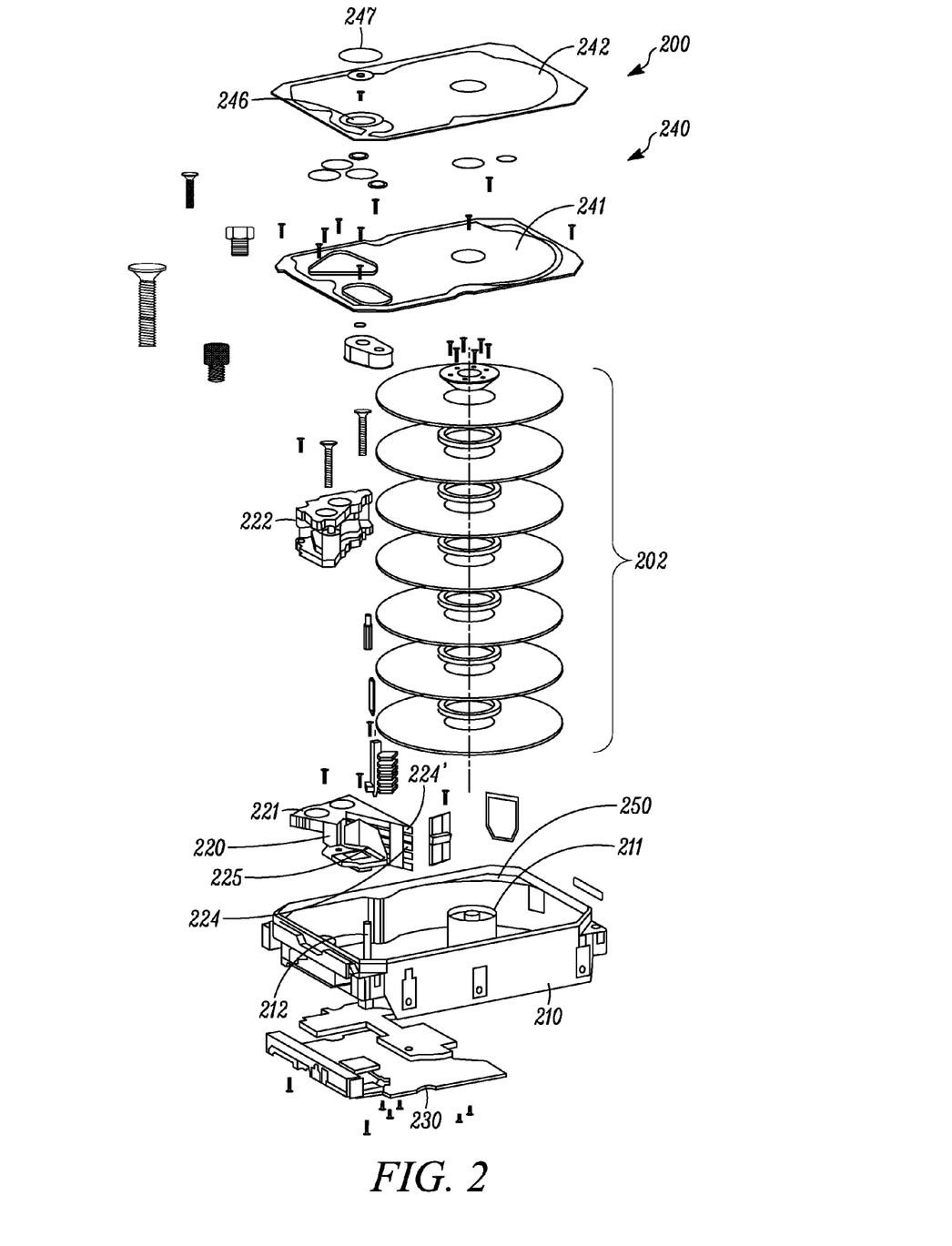
FIG. 2 is an exploded perspective view of a disk drive having a sealable disk enclosure, according to an example embodiment.

FIG. 2 is an exploded perspective view of a disk drive 200 having a sealable disk enclosure, according to an example embodiment. The disk drive 200 includes a base 210 having a spindle 211 rotatably attached to the base. Attached to the spindle 211 are a plurality of disks 202. The plurality of disks 202 are clamped to the spindle 211. A spindle motor (not shown) is housed within the spindle. The spindle motor rotates the spindle 211 and the plurality of disks 202 which are attached thereto. As shown in FIG. 2, there are seven disks which form a disk stack. The base also includes a pivot 212. Attached to the pivot is a bearing cartridge and a head suspension assembly 220. On one end of the head suspension assembly 220 there is a voice coil 221. On the other end of the head suspension assembly 220 is a set of arms 224. The set of arms carries a plurality of suspensions or load beams 224'. The suspensions or load beams 224' have sliders attached thereto. The sliders include read and write elements. The head suspension set assembly 220 and the suspensions or load beams 224' attached thereto engage the disk stack and hold the transducers in transducing relationship with the major surfaces of the disks 202. The voice coil 221 is positioned between a voice coil magnet 222 which is also attached to the base 210. The voice coil motor is formed by the voice coil magnet 222 and the voice coil 221. A voice coil motor is used to rotate the head suspension assembly 220 and the attached read and write elements the various radial positions with respect to the disks. Also attached the base is a cover 240. The cover 240 has a first cover 241 and a second cover 242. The first cover 241 and the second cover 242 are attached to the base 210 to form a substantially sealed disk enclosure 250. One or more seal gaskets or cover seal gaskets may be used to substantially seal the disk enclosure 250. The cover 240 also includes an opening 246 therein. The opening 246 serves as a port for injecting gas into the disk enclosure 250. A seal 247 is used to seal the opening 246 after gas has been injected into the disk enclosure.

Low-density gases, such as helium, when placed into the disk enclosure have been found to reduce power consumption and also reduce nonrepeatable run out (NRRO) errors. Generally it was thought that the best approach was to use pure helium or a pure low-density gas to feel the disk enclosure 250. Part of the manufacturing processes to test the disk drives. It was found after a long run test at high temperature that Fe contamination was generated by the first cover 241 of stainless steel. The long test drive high temperature is used to simulate time of operation. It was found that the Fe contamination was deposited on at least one of the disk surfaces and caused various hard or unrecoverable errors related to an increased fly height of the transducer that includes the read element and the write element. It was found that the Fe contamination was ultimately being deposited onto the head and causing the high fly height.

Several theories were tested and it was determined that the lack of oxygen resulted in Fe contamination. The native oxide of the interior portion of the cover 241 changes over time in a heated environment area. There was an incubation period where no Fe contamination was generated. During the incubation. Any remaining trace oxygen in the drive is consumed through oxidation of the drive surfaces. Oxygen is picked up by chromium (CR) in the alloy leaving the Fe in a more highly reduced state. The highly reduced Fe could form compounds that are volatile and which drop and are deposited on the at least one of the disk surfaces, such as the major disk surface nearest the cover 241. Another theory is that the reduced FTE forms nanoparticles that could effectively drop from the interior portion of the cover 241. Without oxygen, Fe vapors and or nanoparticles diffused in a line of sight fashion to the disk surface. When deposited on the disk surface the transducer or transducing head which includes the read and write elements would smear the Fe contamination. This would result in some of that Fe contamination being picked up by the slider or transducing head which then flew at too high a fly height with respect to the disk resulting in hard errors. Hard errors are errors unrecoverable. In other words, due to the Fe contamination, the disk drive was failing prematurely.

Figure 3:
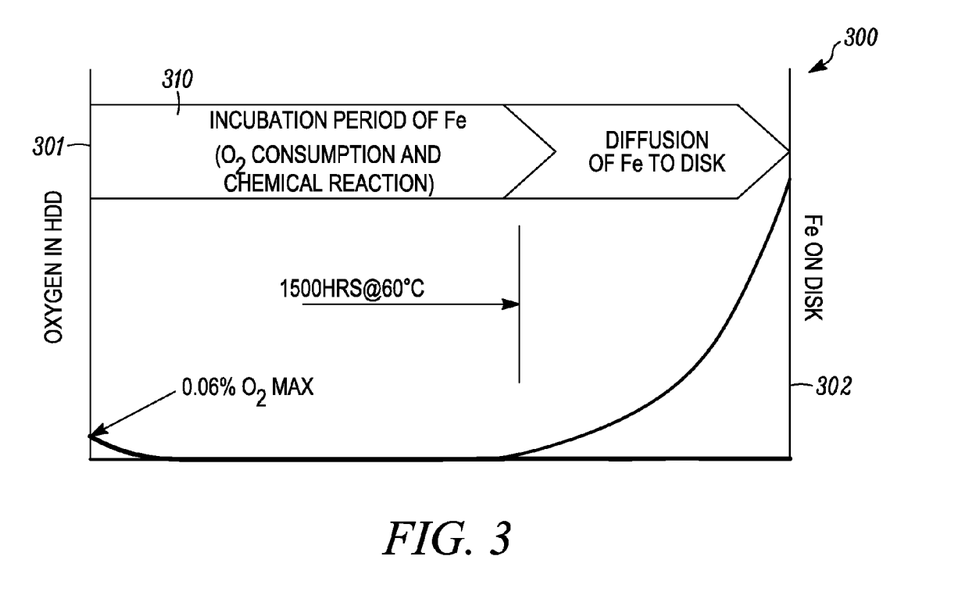
FIG. 3 is a graph of an amount of $O_2$ in a disk enclosure of a disk drive over time and the amount of Fe on a disk surface over that time.

FIG. 3 is a graph 300 of an amount of $O_2$ in a disk enclosure of a disk drive over time and the amount of Fe on a disk surface over that time. In FIG. 3, the amount of oxygen in the disk enclosure was substantially zero. As shown, the amount of oxygen is actually 0.06% at its maximum. The amount of oxygen is shown on the y axis 301. Also shown on the y axis 302 is the amount of Fe on the disk. The x-axis is time. At time zero, the amount of oxygen is 0.06%. Over time the oxygen is consumed in a chemical reaction results in Fe contamination. This time period is referred to as the incubation period 310. After about 1500 hrs. at 60° C., Fe contamination appears on the disk and increases over the remaining time shown in the graph. The incubation period 310 is the 1500 hours. Incubation period 310 includes the time it takes to consume the oxygen and for the chemical reaction which results in Fe contamination to occur. After the incubation period, Fe diffuses onto the disk or the major disk surface.

Figure 4:
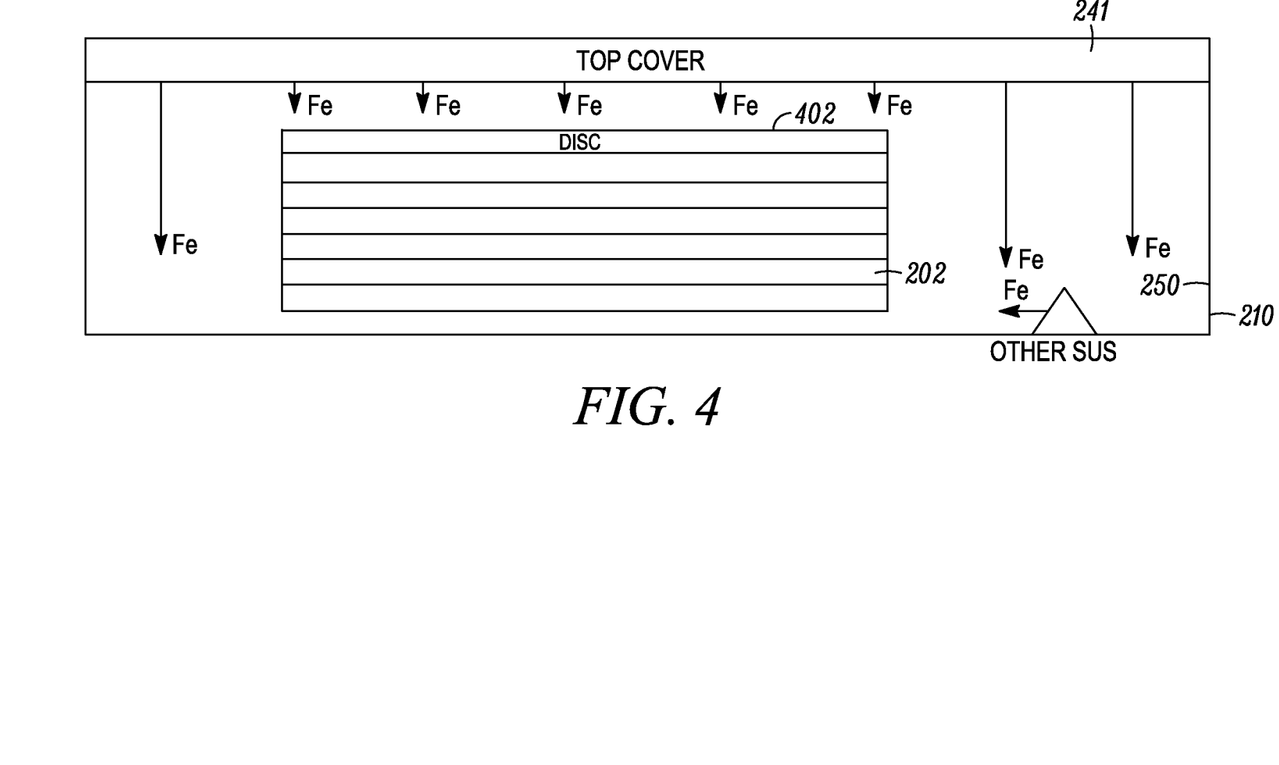
FIG. 4 is a schematic of an enclosure of a disk drive without a spinning hard disk in which Fe deposits occur over time, according to an example embodiment.

FIG. 4 is a schematic of a disk enclosure 250 of a disk drive without a spinning hard disk in which Fe deposits occur over time, according to an example embodiment. The Fe deposits are shown as arrows labeled with Fe. As shown, the Fe deposits dropped rectally down from the cover 241 used to form the disk enclosure 250 with base 210. The major surface 402 of the stack of disks 202 is where the majority of the Fe contamination is deposited. FIG. 4 reflects part of a test to determine if spinning of the disks had any effect on the deposits of the Fe contamination onto the discs in the disk stack.

Figure 5:
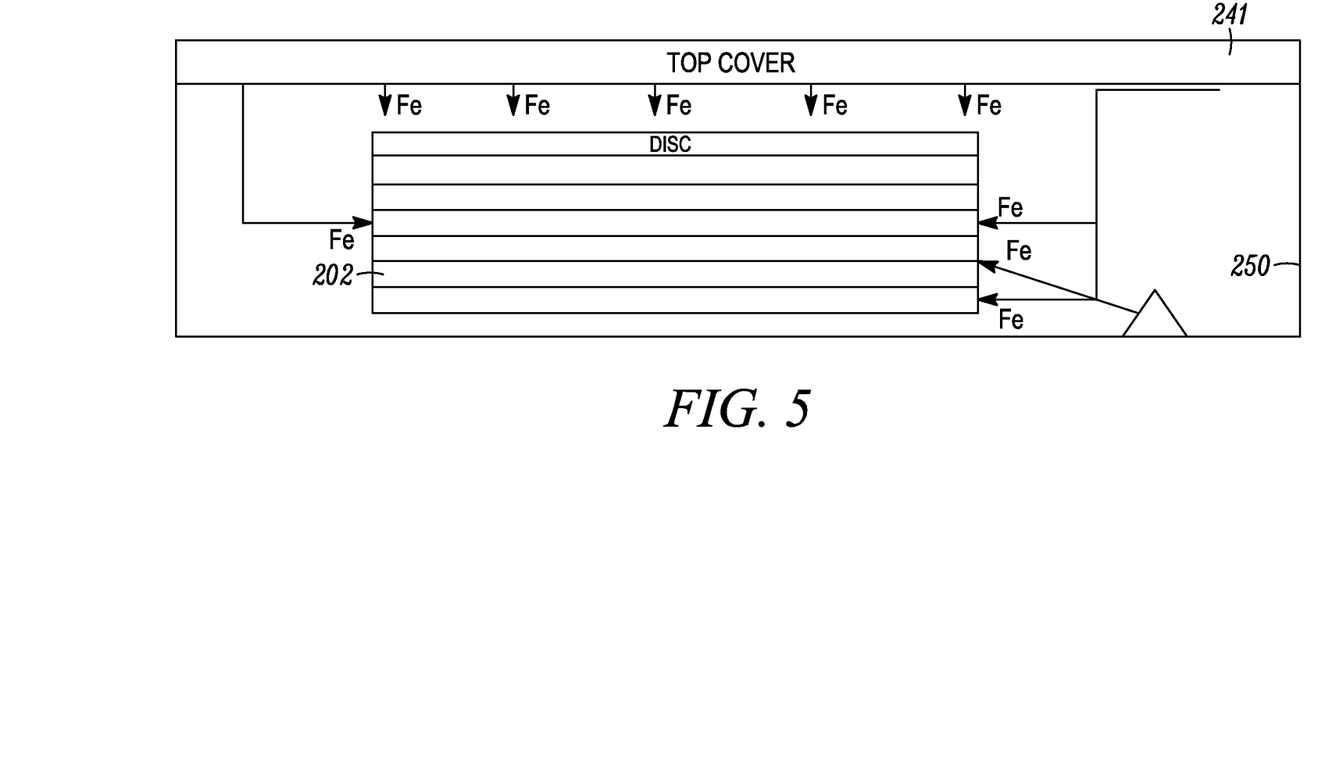
FIG. 5 is a schematic of an enclosure of a disk drive with a spinning hard disk in which Fe deposits occur over time, according to an example embodiment.

FIG. 5 is a schematic of an enclosure of a disk drive with a spinning hard disk in which Fe deposits occur over time, according to an example embodiment. FIG. 5 was also part of the test to determine if Fe contamination would be found on other discs the disk stack other than on the major surface 402. The thought was that the rotating disk may form a vacuum which would ingest the Fe contamination. The potential mechanism is shown in FIG. 5 but in practice negligible Fe contamination was found on other major surfaces of the disk stack 202

Figure 6:
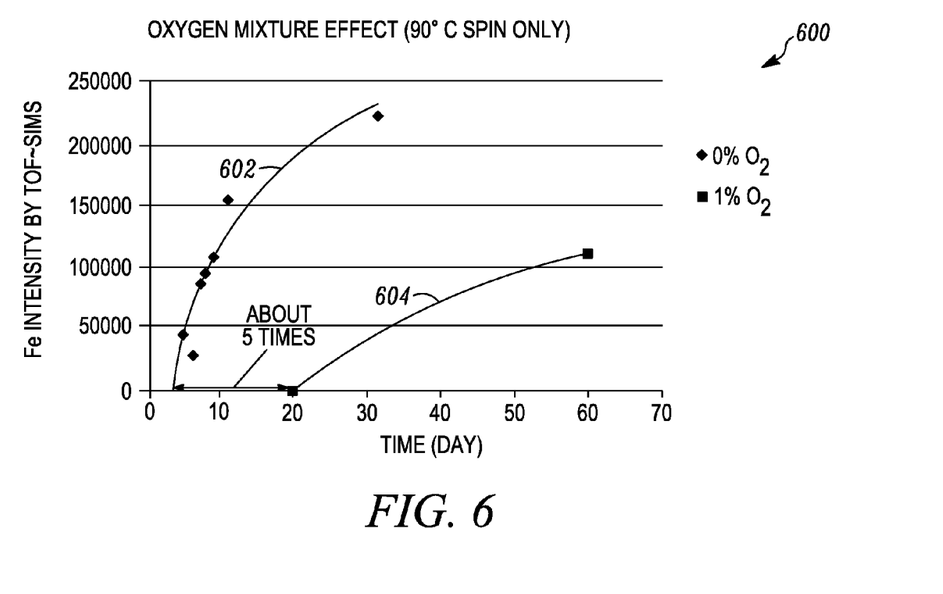
FIG. 6 is a graph showing that a gas mixture that includes 1% oxygen ($O_2$) in a disk enclosure increases the amount of time of failure on a disk surface by approximately five times when compared to 0% oxygen ($O_2$), according to an example embodiment.

To prevent Fe contamination, it was found that adding oxygen to the low-density gas would reduce the amount of Fe contaminants formed. FIG. 6 is a graph 600 that compares a substantially oxygen free environment to an environment including a mixture of gases that has one percent oxygen. As shown in FIG. 6, the amount of Fe contamination could be found on the major disk surface, such as major disk surface 402 shown in FIG. 4, using a time of flight secondary ion mass spectrometer (TOF-SIMS) to measure Fe intensity. This is shown on the y-axis. The x-axis reflects the amount of time. The temperature was elevated to 90° C. in order to shorten testing time. FIG. 6 shows that a gas mixture that includes 1% oxygen ($O_2$) in a disk enclosure increases the amount of time of failure (TOF) on a disk surface by approximately five times when compared to substantially 0% oxygen ($O_2$), according to an example embodiment. With 0% oxygen or substantially 0% oxygen the time of failure occurred about four days as depicted by curve 602. When 1% oxygen was added to the mixture of gases within the disk enclosure 250, the time of failure was approximately 20 days as depicted by curve 604.

Further tests were conducted with various types and mixtures of gases. Some of the results are set forth below:
He 100%: Fe contamination detected
Air 100%: No Fe contamination detected
He 90% with Air 10%: No Fe contamination detected
N2 100%: Fe contamination detected
He 99% with O2 1%: No Fe contamination detected These evaluation test results suggested the cause of Fe contamination was the absence of oxygen, not the existence of He.

Further tests were conducted with various amounts of oxygen in a mixture. It was found that the amount or intensity of the Fe deposit on the major surface of the disk was reduced with increasing levels of oxygen in the gas mixture. It was found that approximately 1 to 3% oxygen mixed with a low-density gas substantially lengthened the incubation time. In other words, with 2% of oxygen placed into the disk enclosure 250, the incubation time would be substantially extended.

Figure 7:
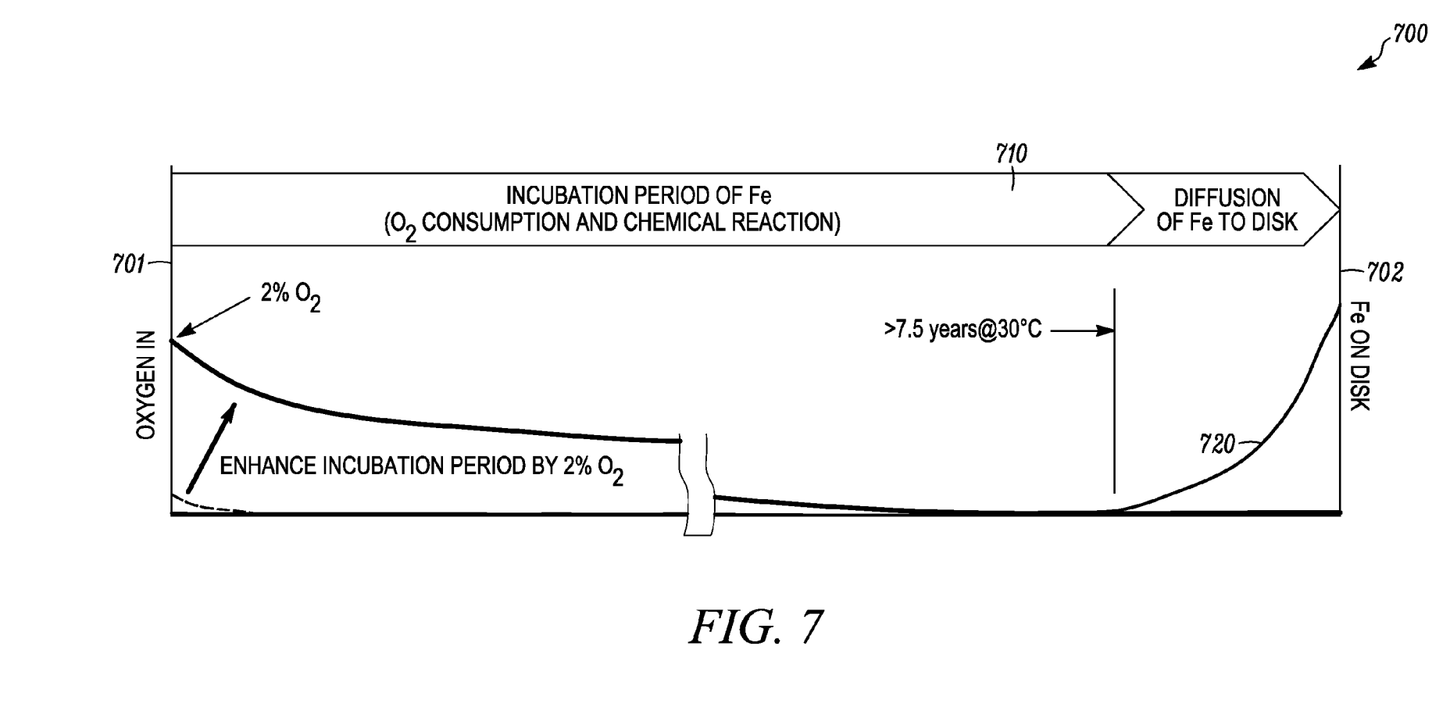
FIG. 7 is a graph of an amount of $O_2$ in an enclosure of a disk drive over time and the amount of Fe on a disk surface over that time, the initial amount of $O_2$ being about 2%, according to an example embodiment.

FIG. 7 is a graph 700 of an amount of $O_2$ in an enclosure of a disk drive over time and the amount of Fe on a disk surface over that time, according to an example embodiment. The amount of oxygen ($O_2$) in disk enclosure at time zero is approximately 2% as shown by the y-axis 701. The amount of Fe contamination in the disk enclosure 250 is shown on the Y axis 702. The x-axis reflects the amount of time. Y-axis 701 is at time $T_o$ and y-axis 702 is at time T+7.5 years. The initial amount of $O_2$ being about 2% is depleted over time. The addition of 2% of oxygen increases the incubation time period 710 to 7.5 years. After approximately 7.5 years, Fe contamination will form and diffuse to at least one of the disks in the disk stack. The curve 720 shows an increase in Fe contamination within the disk enclosure 250 of the disk drive during the time beyond 7.5 years.

Figure 8:
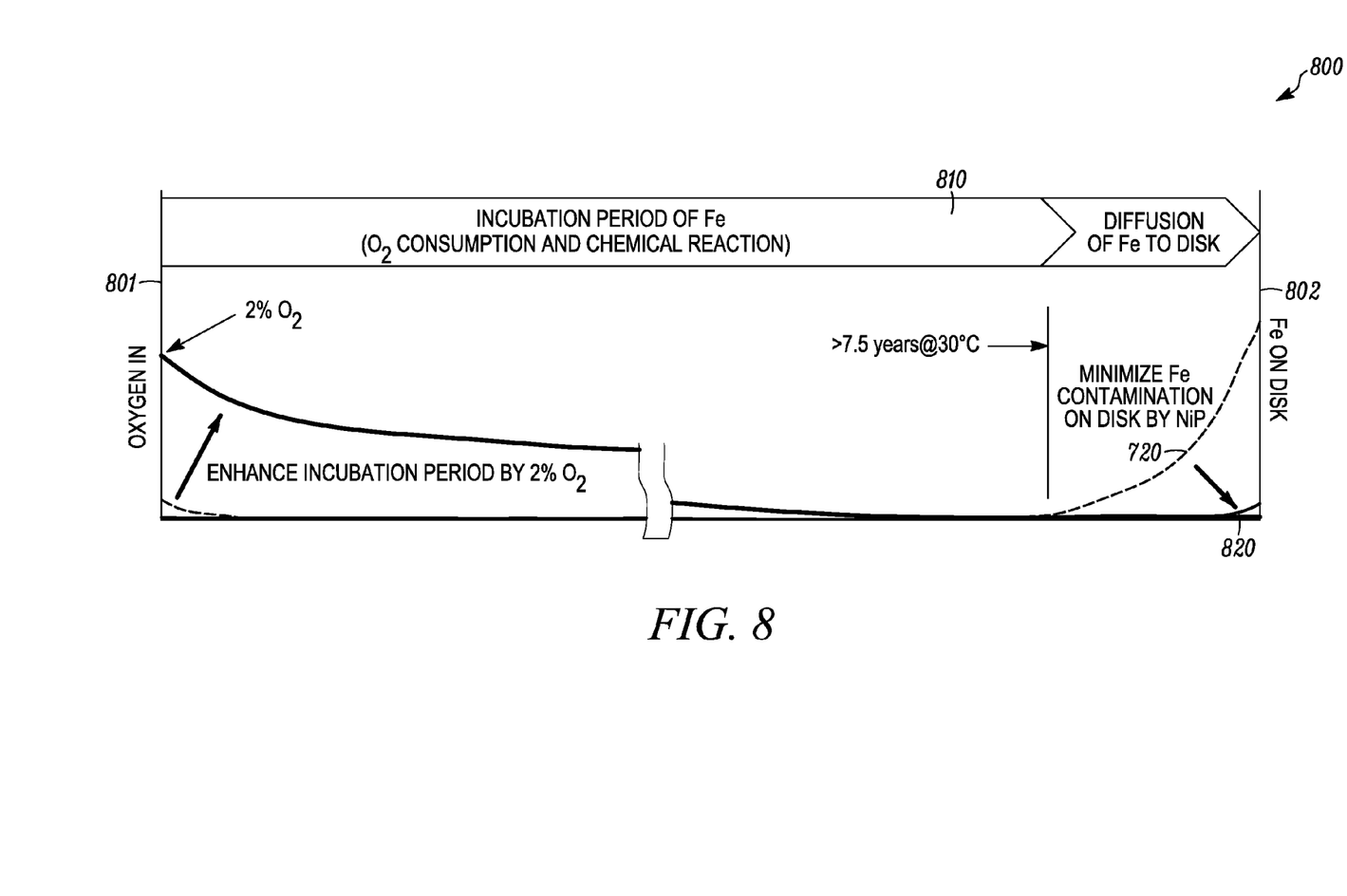
FIG. 8 is a graph of an amount of $O_2$ in an enclosure of a disk drive over time and the amount of Fe on a disk surface over that time, the initial amount of $O_2$ being about 2%, the drive also having a plated cover, according to an example embodiment.

FIG. 8 is a graph 800 of an amount of $O_2$ in an enclosure 250 of a disk drive over time and the amount of Fe on a disk surface over that time, the initial amount of $O_2$ being about 2%, the drive also having a plated cover, according to an example embodiment. Again the amount of oxygen at time $T_o$ is shown at the y-axis 801 and the amount of Fe contamination on the disk is shown at the y-axis 802. Time is reflected on the x-axis. The y-axis 802 occurs at more than 7.5 years of time. The cover portion of the disk drive which is part of the interior surface of the disk enclosure 250 is plated with nickel. The result of the combination of having about 2% oxygen at time $T_o$ and having the cover 241 plated with nickel results in very little Fe contamination at the time T+7.5 years. The curve 820 shows the increase in Fe contamination after 7.5 years. The dotted line curve 720 shows the result of not having a plated cover 241. In other words, much more Fe contamination is observed.

Figure 9:
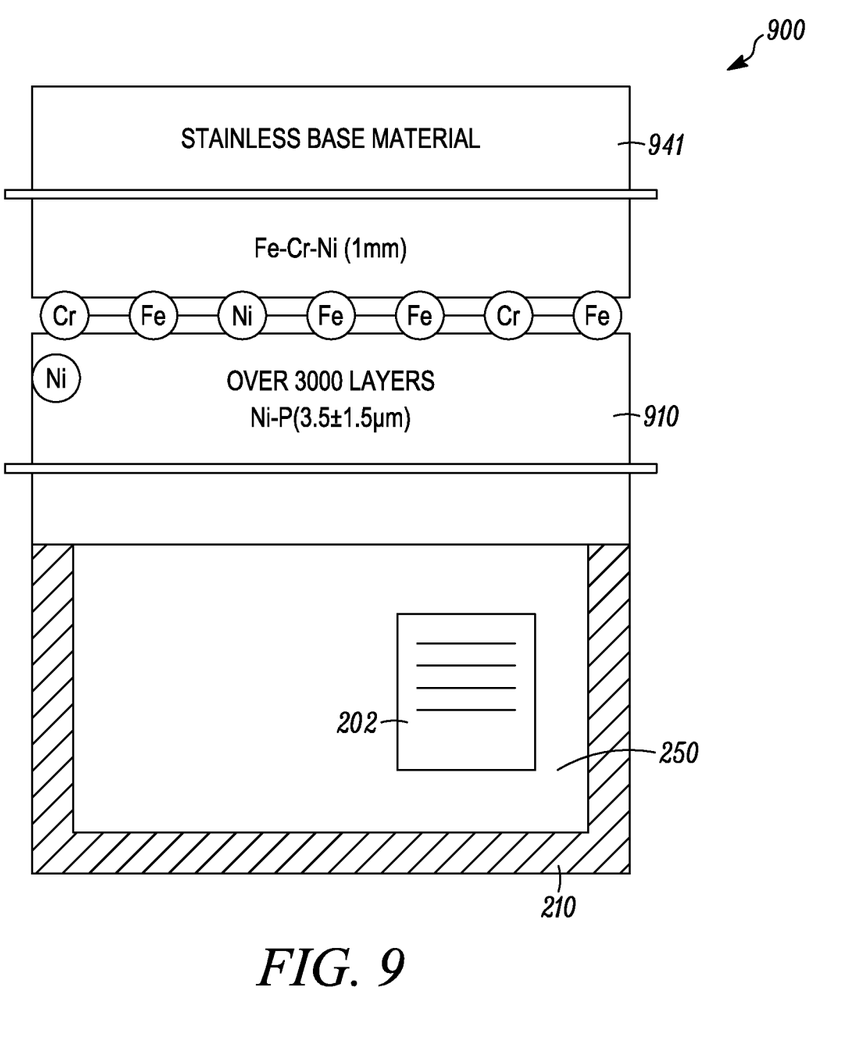
FIG. 9 is a schematic of an enclosure of a disk drive having a cover that is plated with Nickel or an alloy of Nickel, according to an example embodiment.

FIG. 9 is a schematic of a disk enclosure 250 of a disk drive 900 having a cover 941 that is plated with Nickel 910 or an alloy of Nickel, according to an example embodiment. The disk enclosure 250 includes a disk stack 202. The cover 941 is attached to the base 210 of the disk drive 900. As shown the surface of the cover 941 which faces the interior of the disk enclosure 250 is plated with nickel or an alloy of nickel 910. This slows the production of Fe contaminants in the disk enclosure at future times.

Figure 10:
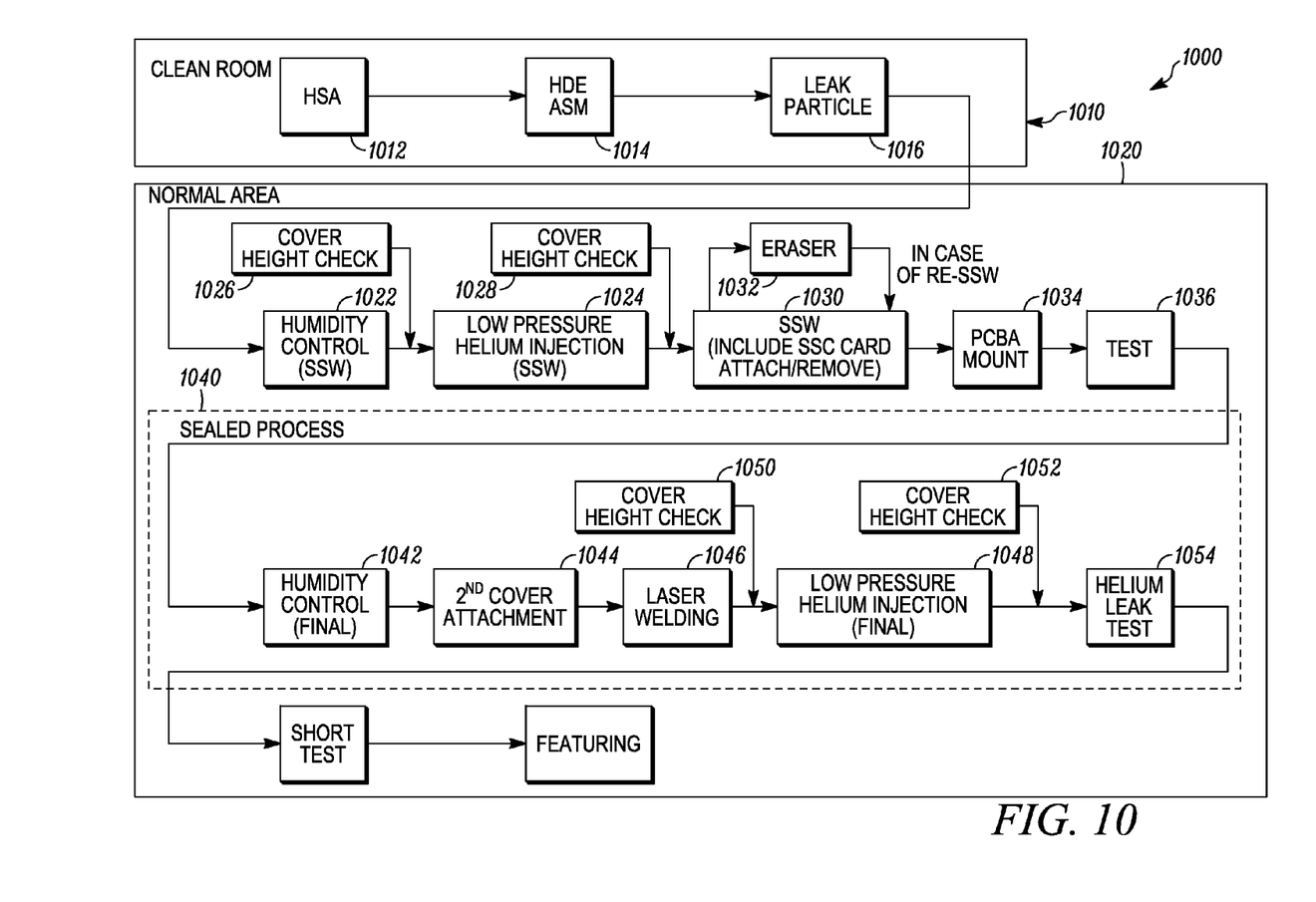
FIG. 10 is a flow diagram of a method for assembling a hard disk drive, according to an example embodiment.

FIG. 10 is a flow diagram of a method 1000 for assembling a hard disk drive, according to an example embodiment. The method 1000 includes a first portion 1010 which is done in a clean room, and a second portion 1020 which is done in a normal area. The method 1000 includes placing the head suspension assembly into the base 1012. The hard drive disk enclosure (HDD) is then assembled 1014. This step includes attaching the disk stack and all other necessary components which will be housed within the disk enclosure to the base of the disk drive. The cover is also attached to the base to form the seal disk enclosure or substantially sealed disk enclosure. The assembled head disk enclosure is then tested for leaks and particles 1016. The remaining assembly steps take part in a normal area, as depicted by reference numeral 1020. Some of the assembly in the normal area is done as a sealed process as depicted by reference numeral 1040. In the normal area, the committee is controlled 1022 and helium is injected into the disk drive enclosure at low pressure 1024. The cover height is checked before the injection, as depicted by reference number 1026, and is also checked after the injection, as depicted by reference numeral 1028. The sector servo is written using the product heads 1030. If the sector servo is not adequate upon test is erased 1032 and rewritten. Once the servo sectors are written satisfactorily, the printed circuit board assembly is mounted to the bottom of the base 1034 and the disk drive undergoes testing 1036.

The sealed process 1040 includes controlling the humidity 1042 and attaching the second cover 1044. The second cover is welded into place 1046. A cover height check 1050 is performed in a final amount of helium is injected through the cover 1048. A second cover height check 1052 is performed after the injection step 1048. The helium leak test is then performed 1054. A short test is then done 1060. The short test includes using the product heads of the hard disk drive to perform a read/write test.

Figure 11:
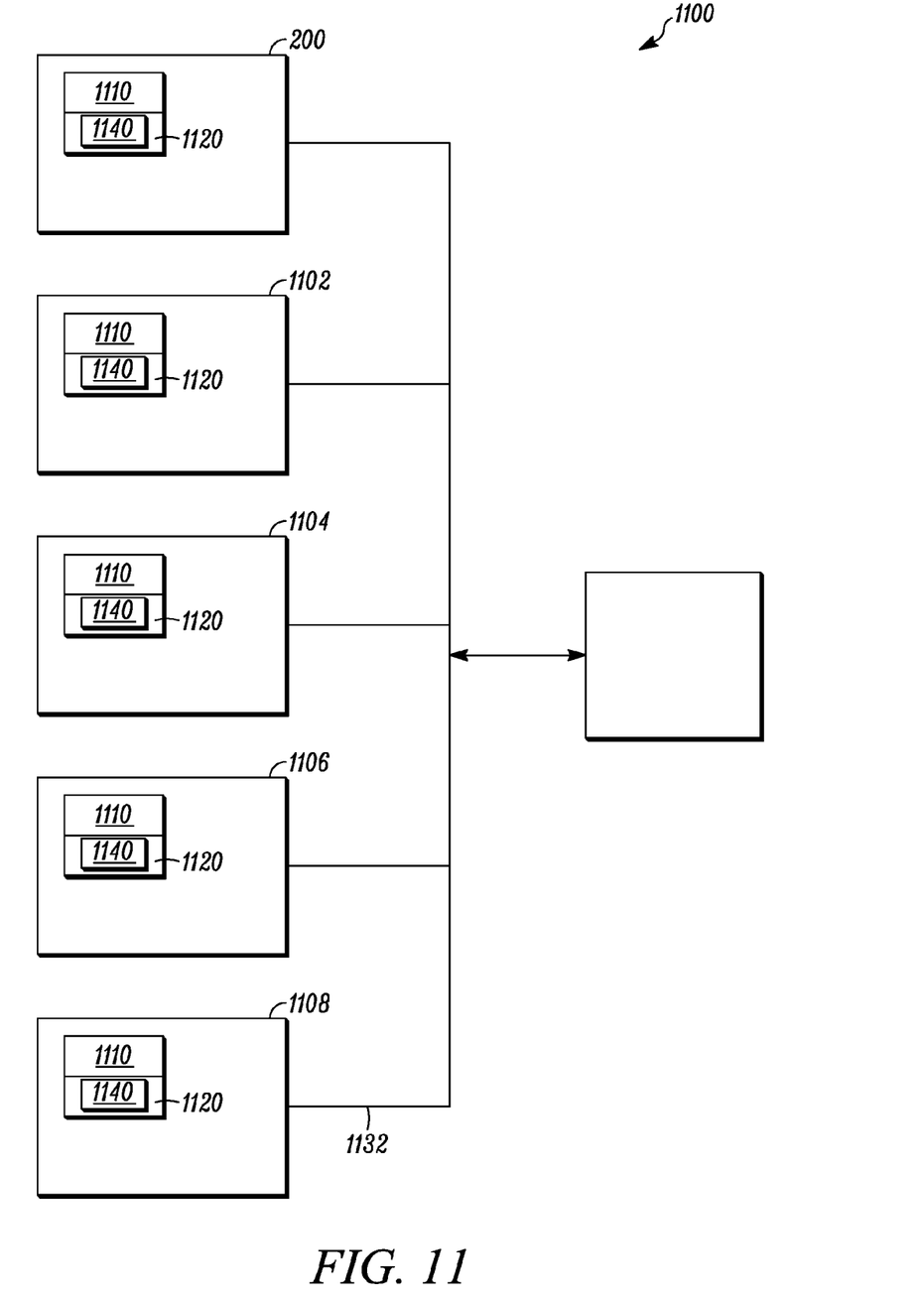
FIG. 11 is a schematic diagram of a storage system, according to an example embodiment.

A disk drive 200 for storing information representing data includes a base 210, a spindle rotatably attached to the base, and a plurality of disks two of two having magnetizable disk surfaces attached to the spindle. The disk drive 200 also includes a plurality of read/write transducers for writing to and reading from the plurality of magnetizable disk surfaces, and a cover 240 attached to the base 210. The cover 240 and base 210 form a substantially sealed disk enclosure 250. The spindle, the plurality of disks 202, and the read/write transducers are within the disk enclosure 250. The disk enclosure 250 is substantially filled with a mixture of gases including an oxygen portion in the range of 0.1-3% of the mixture, and a low-density gas portion. In some embodiments, the oxygen portion is 1.0-2.5% of the gas filling the disk enclosure 250. In other embodiments, the oxygen portion is 1.8-2.2% of the gas filling the disk enclosure 250. In still another embodiment, oxygen portion is 1.9-2.1% of the gas filling the disk enclosure 250. In another embodiment, the cover 240 includes an interior portion 241 which forms part of the interior portion of the disk enclosure 240. In this particular embodiment, the interior portion 241 is plated with a substance that inhibits the formation of oxides on the cover. The interior portion 241 can be plated with Nickel. In other embodiments, other interior portions of the base and the plated with Nickel. Some of these other interior portions may be components of the disk drive which are housed within the disk enclosure 250. In one embodiment, the cover 240 further includes a first cover 241 for forming the disk enclosure, and a second cover 242 which covers the first cover. A seal or gasket is positioned between the cover 240 and the base 210 to substantially seal the disk enclosure 250. The cover 241 also has a substantially sealable opening 246 therein for filling the disk enclosure 250 with a mixture of low-density gas and oxygen. In some embodiments, the disk drive 200 further comprises an oxygen sensing system 1110 for sensing a level of oxygen within the sealed disk enclosure 250. The oxygen sensing system 1110 can also include a notification system 1120 for sending a notification when the oxygen level falls below a threshold value.

A method for preventing a premature failure within a disk drive includes forming a substantially sealed disk enclosure from a base and a cover, and adding a mixture of gas to the disk enclosure. The mixture includes a low-density gas portion and an oxygen portion. The oxygen portion is in the range of 1-3% of the gas mixture, in one embodiment, or is in the range of 1.8-2.3% of the gas mixture in another embodiment. So, oxygen levels in these ranges in th presence of an unplated or bare stainless steel cover reduce or substantially prevent the generation of contaminants that could cause a disk drive to fail prematurely. In still another embodiment, the method includes plating an interior portion of the cover with a substantially non-oxidizing material. In further embodiments, the method includes plating an interior portion of the base with a substantially non-oxidizing material. In still another embodiment, an interior portion of the disk enclosure can be plated with a substantially non-oxidizing material. The method can also include covering at least some of the interior components with a substantially non-oxidizing material. In other embodiments, the method monitoring the level of oxygen within the disk enclosure.

FIG. 11 is a schematic diagram of a storage system 1100, according to an example embodiment. The storage system 1100 includes a plurality of disk drives 200, 1102, 1104, 1106, 1108 which are attached to a bus for carrying data and commands to and from the various disk drives. The bus 1132 is communicatively coupled to an interface 1130. The plurality of disk drives can be a data warehouse or a standalone server or other storage device for use in a computer system. The interface can be to a host or to another network. One network might be a wide area network, the Internet, or a local area network for use in an office environment. Each of the disk drives 200, 1102, 1104, 1106, 1108 includes an oxygen sensor 1110. The oxygen sensor is able to sense the level oxygen within the disk enclosure (shown in FIGS. 2, 4 and 5. The disk drives also include a sending unit 1120. The sending unit will send a message or other notification regarding the oxygen level within the disk drive. For example if the oxygen level in disk drive 200 was low for a time early in the lifecycle of the disc drive 200, a notification might be sent to the interface 1130. The notification might go to another system associated with a maintenance company that would assess the information and determine if service was necessary. For example if the oxygen level is so low that a failure due to Fe contamination would occur very early in the lifecycle of the product, the maintenance provider might decide to come and replace that disk drive with another before the failure occurs. It should be pointed out that not all the disk drives have to include an oxygen monitor and a sender or notification device. Some disk drives just may not have these features. Disk drives without these features could be used alongside disk drives with these features in a storage system such as shown in FIG. 11.

A storage system for storing information representing data includes a plurality of disk drives. At least some of the plurality of disk drives further include a base, a spindle rotatably attached to the base, and a plurality of disks having magnetizable disk surfaces attached to the spindle. At least some of the plurality of disk drives also include a plurality of read/write transducers for writing to and reading from the plurality of magnetizable disk surfaces, a cover attached to the base, and a gas substantially filling a disk enclosure. The cover and the base form a substantially sealed disk enclosure. The spindle, and the plurality of disk and the read/write transducers are within the disk enclosure. The gas further includes an oxygen portion in the range of 1.6-2.3%; and a low-density gas portion. In some embodiments, at least some of the plurality of disk drives have an oxygen sensing system for sensing a level of oxygen within the sealed disk enclosure, and a notification system for sending a notification when the oxygen level falls below a threshold value.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

The foregoing description, for purposes of explanation, used specific nomenclature to provide a thorough understanding of the invention. However, it will be apparent to one skilled in the art that the specific details are not required in order to practice the invention. Thus, the foregoing descriptions of specific embodiments of the present invention are presented for purposes of illustration and description. They are not intended to be exhaustive or to limit the invention to the precise forms disclosed. It will be apparent to one of ordinary skill in the art that many modifications and variations are possible in view of the above teachings.

The embodiments were chosen and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents. While the embodiments have been described in terms of several particular embodiments, there are alterations, permutations, and equivalents, which fall within the scope of these general concepts. It should also be noted that there are many alternative ways of implementing the methods and apparatuses of the present embodiments. It is therefore intended that the following appended claims be interpreted as including all such alterations, permutations, and equivalents as fall within the true spirit and scope of the described embodiments. These and other example embodiments are within the scope of the following claims.

What is claimed:

1. A disk drive for storing information representing data comprising:
   a base;
   a spindle rotatably attached to the base;
   a plurality of disks having magnetizable disk surfaces attached to the spindle;
   a plurality of read/write transducers for writing to and reading from the plurality of magnetizable disk surfaces;
   a cover attached to the base, the cover and base forming a substantially sealed disk enclosure, the spindle, the plurality of disk and the read/write transducers being within the disk enclosure; and a gas substantially filling the disk enclosure, the gas further comprising:
an oxygen portion in the range of 0.1-3%; and
a low-density gas portion, the oxygen portion and the low-density gas portion placed in the disk enclosure during the time of manufacture.

2. The disk drive of claim 1 wherein the oxygen portion is 1.0-2.5% of the gas filling the disk enclosure.

3. The disk drive of claim 1 wherein the oxygen portion is 1.8-2.2% of the gas filling the disk enclosure.

4. The disk drive of claim 1 wherein the oxygen portion is 1.9-2.1% of the gas filling the disk enclosure.

5. The disk drive of claim 1 wherein the cover further comprises an interior portion which forms part of the interior portion of the disk enclosure, the interior portion plated with a substance that inhibits the formation of oxides on the cover.

6. The disk drive of claim 1 wherein the cover further comprises an interior portion which forms part of the interior portion of the disk enclosure, the interior portion plated with Nickel.

7. The disk drive of claim 1 wherein the cover further comprises an interior portion and the base comprises an interior portion, the interior portions of the base and the plated with Nickel.

8. The disk drive of claim 1 wherein the cover further comprises
a first cover for forming the disk enclosure; and
a second cover which covers the first cover.

9. The disk drive of claim 1 further comprising a seal positioned between the cover and the base to substantially seal the disk enclosure.

10. The disk drive of claim 1 wherein the cover has a substantially sealable opening therein for filling the disk enclosure with a mixture of low-density gas and oxygen.

11. A disk drive for storing information representing data comprising:
a base;
a spindle rotatably attached to the base;
a plurality of disks having magnetizable disk surfaces attached to the spindle;
a plurality of read/write transducers for writing to and reading from the plurality of magnetizable disk surfaces;
a cover attached to the base, the cover and base forming a substantially sealed disk enclosure, the spindle, the plurality of disk and the read/write transducers being within the disk enclosure; and
a gas substantially filling the disk enclosure, the gas further comprising:
an oxygen portion in the range of 0.1-3%; and
a low-density gas portion; and
an oxygen sensing system for sensing a level of oxygen within the sealed disk enclosure.

12. The disk drive of claim 11 wherein the oxygen sensing system for sensing a level of oxygen within the sealed disk enclosure includes a notification system for sending a notification when the oxygen level falls below a threshold value.

13. A method for preventing a premature failure within a disk drive comprising:
forming a substantially sealed disk enclosure from a base and a cover;
adding a mixture of gas to the disk enclosure, the mixture including a low-density gas portion and an oxygen portion, the oxygen portion in the range of 0.1-3% of the gas mixture.

14. The method of claim 13 further comprising plating an interior portion of the cover with a substantially non-oxidizing material.

15. The method of claim 13 further comprising plating an interior portion of the base with a substantially non-oxidizing material.

16. The method of claim 13 further comprising plating an interior portion of the disk enclosure with a substantially non-oxidizing material.

17. The method of claim 13 further comprising a plurality of components within the disk enclosure, the method including covering at least some of the interior components with a substantially non-oxidizing material.

18. A method for preventing a premature failure within a disk drive comprising:
forming a substantially sealed disk enclosure from a base and a cover;
adding a mixture of gas to the disk enclosure, the mixture including a low-density gas portion and an oxygen portion, the oxygen portion in the range of 0.1-3% of the gas mixture; and
monitoring the level of oxygen within the disk enclosure.

19. The method of claim 13 wherein the oxygen portion of the mixture of gas within the disk enclosure is in the range of 1.8-2.3% of the gas mixture.

20. A storage system for storing information representing data comprising a plurality of disk drives, at least some of the plurality of disk drives further comprising:
a base;
a spindle rotatably attached to the base;
a plurality of disks having magnetizable disk surfaces attached to the spindle;
a plurality of read/write transducers for writing to and reading from the plurality of magnetizable disk surfaces;
a cover attached to the base, the cover and base forming a substantially sealed disk enclosure, the spindle, the plurality of disk and the read/write transducers being within the disk enclosure; and
a gas substantially filling the disk enclosure, the gas further comprising:
an oxygen portion in the range of 0.5-2.3%; and
a low-density gas portion, the oxygen portion and the low-density gas portion placed in the disk enclosure during the time of manufacture.

21. A storage system for storing information representing data comprising a plurality of disk drives, at least some of the plurality of disk drives further comprising:
a base;
a spindle rotatably attached to the base;
a plurality of disks having magnetizable disk surfaces attached to the spindle;
a plurality of read/write transducers for writing to and reading from the plurality of magnetizable disk surfaces;
a cover attached to the base, the cover and base forming a substantially sealed disk enclosure, the spindle, the plurality of disk and the read/write transducers being within the disk enclosure; and
a gas substantially filling the disk enclosure, the gas further comprising:
an oxygen portion in the range of 0.5-2.3%; and
a low-density gas portion, wherein at least some of the plurality of disk drives further comprise:
an oxygen sensing system for sensing a level of oxygen within the sealed disk enclosure; and
a notification system for sending a notification when the oxygen level falls below a threshold value.

* * * * *